United States Patent [19]

Fanning et al.

[11] Patent Number: 5,530,308
[45] Date of Patent: Jun. 25, 1996

[54] ELECTROMAGNETIC PUMP STATOR COIL

[75] Inventors: Alan W. Fanning, San Jose; Leslie R. Dahl, Livermore, both of Calif.

[73] Assignee: General Electric Company, San Jose, Calif.

[21] Appl. No.: 3,993

[22] Filed: Jan. 15, 1993

Related U.S. Application Data

[63] Continuation-in-part of Ser. No. 836,475, Feb. 18, 1992, Pat. No. 5,195,231.

[51] Int. Cl.⁶ .................................................. H02K 3/04
[52] U.S. Cl. ........................... 310/208; 310/71; 310/179; 310/184
[58] Field of Search .................................. 310/208, 184, 310/198, 180, 179, 71; 336/186, 187, 223

[56] References Cited

U.S. PATENT DOCUMENTS

| | | | |
|---|---|---|---|
| 3,482,131 | 12/1969 | Lytle | 310/156 |
| 3,546,644 | 12/1970 | Wilburn et al. | 336/223 |
| 3,566,171 | 2/1971 | Tichy | 310/184 |
| 3,787,766 | 1/1974 | Graefnitz et al. | 336/223 UX |
| 4,212,592 | 7/1980 | Olich et al. | 417/50 |
| 4,376,904 | 3/1983 | Horrigan | 310/208 |
| 4,446,393 | 5/1984 | Finegold | 310/184 |
| 4,508,677 | 4/1985 | Craig et al. | 376/174 |
| 4,761,628 | 8/1988 | Nishi et al. | 336/223 |
| 4,859,885 | 8/1989 | Kliman et al. | 310/11 |
| 4,882,514 | 11/1989 | Brynsvold et al. | 310/208 |
| 4,901,048 | 2/1990 | Williamson | 336/223 |
| 4,916,345 | 4/1990 | Tong | 310/208 |

FOREIGN PATENT DOCUMENTS

| | | |
|---|---|---|
| 0345916 | 12/1989 | European Pat. Off. . |
| 0557037 | 8/1993 | European Pat. Off. . |
| 812409 | 5/1937 | France . |

*Primary Examiner*—R. Skudy
*Attorney, Agent, or Firm*—James E. McGinness

[57] ABSTRACT

An electrical stator coil for an electromagnetic pump includes a continuous conductor strip having first and second terminals at opposite ends thereof and an intermediate section disposed therebetween. The strip is configured in first and second coil halves, with the first coil half including a plurality of windings extending from the first terminal to the intermediate section, and the second coil half including a plurality of windings extending from the second terminal to the intermediate section. The first and second coil halves are disposed coaxially, and the first and second terminals are disposed radially inwardly therefrom with the intermediate section being disposed radially outwardly therefrom.

6 Claims, 6 Drawing Sheets

5,530,308

ELECTROMAGNETIC PUMP STATOR COIL

The U.S. Government has rights in this invention in accordance with Contract No. DOE DE-AC03-89SF17445 awarded by the Department of Energy.

The present invention is a continuation-in-part of application Ser. No. 07/836,475, filed 18 Feb. 1992 by A. W. Fanning et al, entitled "Method For Producing Inner Stators For Electromagnetic Pumps now U.S. Pat. No. 5,195,231".

This invention is concerned with an improvement in annular linear flow electromagnetic induction pumps such as the type commonly used to circulate electrically conducting liquid metal coolant through a liquid metal cooled nuclear fission reactor plant. Such coolant circulating pumps and liquid metal cooled nuclear fission reactors, and their operation or function in this service are disclosed in U.S. Pat. No. 4,508,677, issued Apr. 2, 1985, for example.

BACKGROUND OF THE INVENTION

Annular linear flow electromagnetic induction pumps for impelling liquid metals generally comprise an annular flow channel or duct which is surrounded by a column composed of a multiplicity of alternating annular stator coils and magnetic stator iron. This type of electromagnetic pump, commonly known as a single stator, annular linear flow induction pump, and its use in a liquid metal cooled nuclear fission reactor, is disclosed in U.S. Pat. No. 4,859,885, issued Aug. 22, 1989, and U.S. Pat. No. 4,882,514, issued Nov. 21, 1989.

However, a more versatile linear flow electromagnetic induction pump design than those shown in the above patents comprises a double stator system. This electromagnetic pump system comprises the single stator arrangement as shown in the aforesaid patent, which is additionally provided with a second or inner stator arrangement concentrically contained and enclosed within the pump's central linear liquid flow duct or channel. A second stator column is also composed of a multiplicity of alternating annular stator coils and stator iron. In combination, the outer and inner, or double starors act upon the liquid linearly passing through the annular flow duct.

This double stator arranged pump design provides greater pumping capacity per pump unit size, or alternatively equal capacity provided by a smaller pump unit. Accordingly the double stator pump has the advantages of greater efficiency and versatility, among others.

The disclosures and contents of U.S. Pat. Nos. 4,508,677, 4,859,885 and 4,882,514, are incorporated herein by reference.

SUMMARY OF THE INVENTION

An electrical stator coil for an electromagnetic pump includes a continuous conductor strip having first and second terminals at opposite ends thereof and an intermediate section disposed therebetween. The strip is configured in first and second coil halves, with the first coil half including a plurality of windings extending from the first terminal to the intermediate section, and the second coil half including a plurality of windings extending from the second terminal to the intermediate section. The first and second coil halves are disposed coaxially, and the first and second terminals are disposed radially inwardly therefrom with the intermediate section being disposed radially outwardly therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
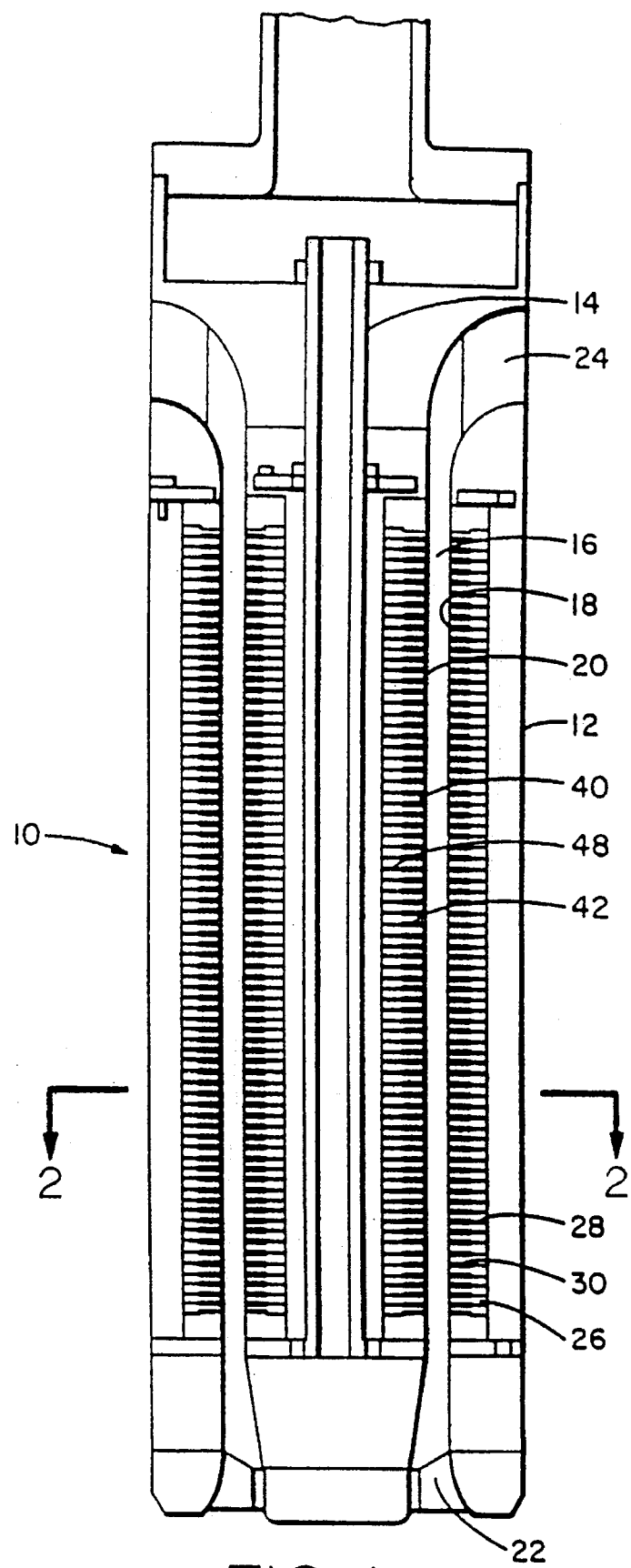
FIG. 1 is a view, part in section, of a double stator annular linear flow electromagnetic pump.
Figure 2:
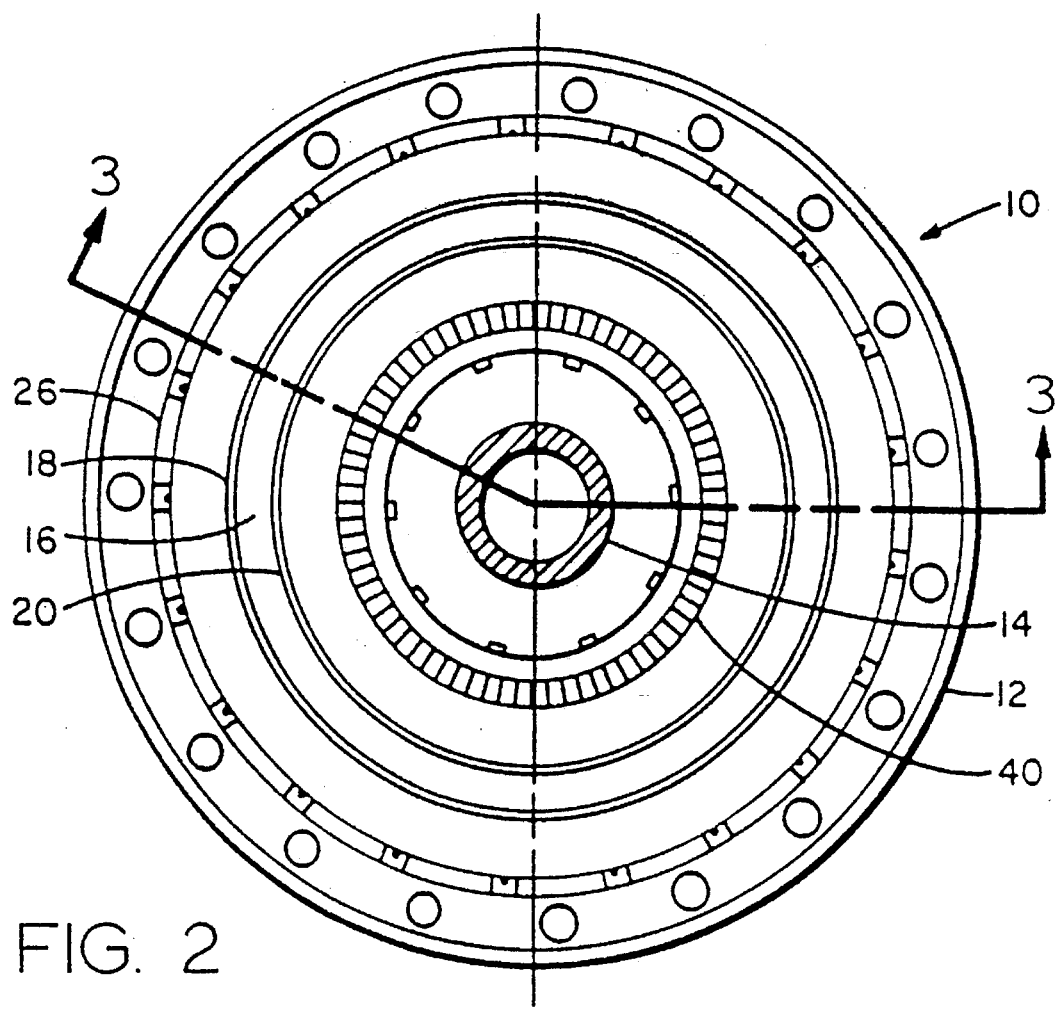
FIG. 2 is a cross-sectional view of the double stator annular linear flow electromagnetic pump of FIG. 1, taken along line 2—2.
Figure 3:
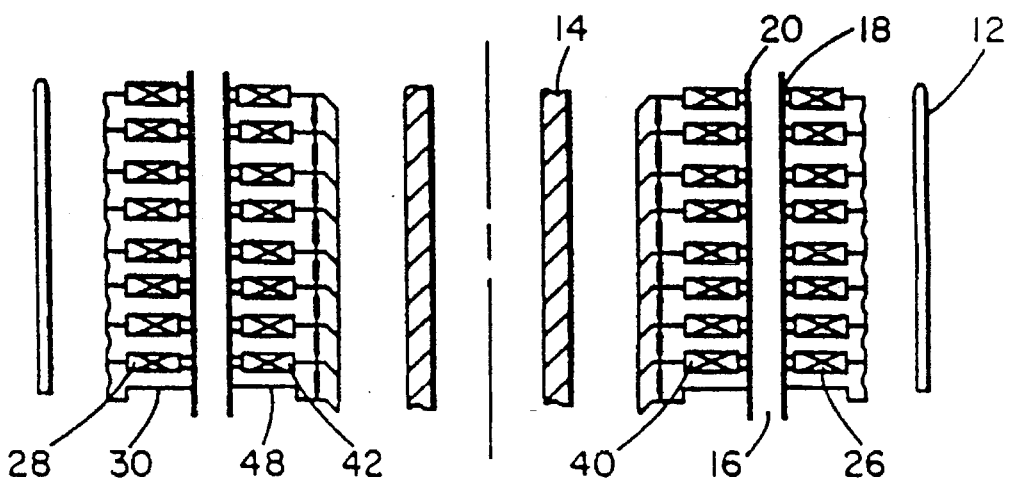
FIG. 3, is a partial cross-sectional view of the double stator assembly of the annular linear flow electromagnetic pump of FIG. 2 taken along line 3—3.

Referring to the drawings, in particular FIGS. 1, 2 and 3, a double stator annular linear flow, electromagnetic induction pump 10, for service in electrically conducting liquid systems, typically comprises the following assemblage of components: Pump housing 12, commonly a cylindrical unit, encloses the electromagnetic induction system and provides the necessary protection to enable the pump to operate submerged within the aggressive environment of liquid sodium commonly utilized as the coolant medium in liquid metal-cooled nuclear fission reactors. A pump assembly inner stator 40 is secured and supported by means of a central support post 14.

The double stator electromagnetic pumps 10 which are the subject of this invention contain an annular flow channel 16 for magnetically impelling the passage of liquid metal therethrough. Annular flow channel 16 is defined by an outer flow conduit 18, and a concentric smaller inner flow conduit 20. An inlet 22 provides entry to the annular flow channel 16, and outlet 24 provides for discharge therefrom, whereby the induced linear flow of liquid metal through the pump 10 is effected, generally upwardly from the bottom inlet 22 to the top outlet 24.

An outer stator 26 comprises an annular column positioned between the pump housing 12 and the outer flow conduit 18, and extends circumferentially around the outside of conduit 18. Outer stator 26 can be generally conventional in design, comprising a multiplicity of alternately stacked annular stator units having stator magnetic irons 28 and stator outer coils 30. The stator coils 30 commonly consist of electrical conductor strips or ribbons of copper metal wound into a suitably sized and coiled unit and wrapped in electrical insulation. The coil terminal, or power leads extend from the outer periphery of the outer coil 30. The stator magnetic irons 28 commonly include thin iron elements or laminations which are aligned side-by-side and laminated into composite units. The iron elements can be laminated into a continuous composite ring, or laminated into a number of individual composite units or packages which in turn are assembled together into a ring configuration.

In a conventional single stator electromagnetic pump as shown in U.S. Pat. No. 4,822,514, the stator iron rings 28 and stator coils 30 are alternately stacked superimposed upon each other, forming a column surrounding the annular flow conduit 18 and provides the magnetic impelling linear flow channel. This single column of stator coils and iron rings external to the annular flow duct provides a pulsed liquid metal impelling force.

Figure 4:
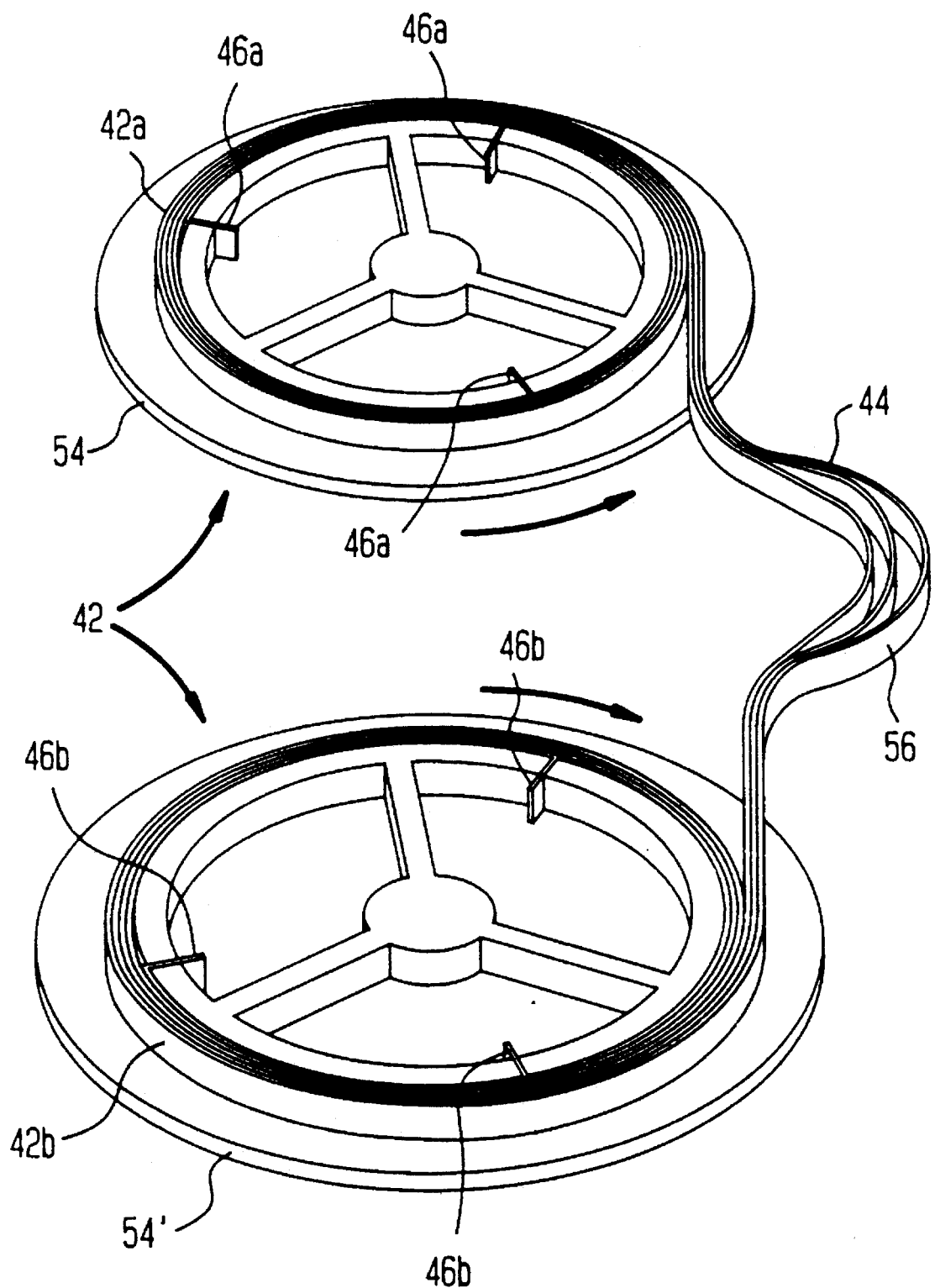
FIG. 4 is a perspective view of coil winding means for producing stator coils.

With a double stator annular linear flow electromagnetic pump to which this invention primarily applies, in addition to the foregoing outer stator 26 common to the single stator pump design, the inner stator 40 comprises an annular column positioned within the inner flow conduit and located circumferentially within and surrounded by conduit 20. Inner stator 40, similar to the outer stator 26, typically consists of inner coils 42 of electrical conductor strips or ribbons 44 of copper metal insulated and wound upon or within itself into suitably sized and coiled units having terminals or leads 46a and 46b extending from inside the coils 42 as shown in FIG. 4 for example. The inner stator 40 also includes stator iron rings 48 as shown in FIG. 1 which have thin iron elements or laminations aligned side-by-side and laminated into a continuous composite ring. Inner stator coils 42 and stator iron rings 48 are alternately stacked superimposed upon each other, forming an annular column enclosed within and surrounded by the inner flow conduit 20. Coils 42 are insulated from the rings 48.

Although both the outer and inner stators 26, 40 are similarly built up or assembled from comparable components comprising alternately stacked conducting stator coils 30, 42 with insulated magnetic iron rings 28, 48 in an annular column, there remains significantly different circumstances or factors to cope with in their assembly and operation. For example, with the outer stator 26, the alignment of succeeding layers of coils 30 and rings 28 is assured by the fact that these annular components are installed around the outside of the cylindrical outer flow conduit 18. However, concerning the inner stator 40, the inner flow conduit 20 is external to the inner stator stack or column 40, and the conduit 20 is not installed around the stator unit until after it is assembled and its wiring completed in an exemplary procedure. Thus, alignment of the inner stator components is required.

Additionally, heat transfer from the outer and inner stators 26, 40 of a double stator, annular linear flow induction electromagnetic pump to the liquid metal impelled through the channel 16 is substantially dependent upon clearances existing at the stator-to-flow annulus duct interface. Namely, large gaps will reduce heat transfer and result in an increase in stator temperatures whereas smaller gaps will result in the opposite effect.

For outer stators, such as 26 in FIG. 1, the gap at the stator-to-flow conduit 18 interface is minimized by the advantageous condition that typical conduit materials, such as stainless steel, have a high thermal expansion coefficient and typical stator iron materials have a lower thermal expansion coefficient. Thus, as the pump is brought up to operating temperature, thermal growth of outer flow conduit 18, exceeds that of outer stator 26, ensuring a close fit at the interface.

However, regarding the inner stator 40 of double stator induction electromagnetic pumps, the use of the same or similar component materials of construction would result in the reverse situation, that is, the inner flow conduit 20 moving away from the inner stator iron ring 48 as the pump 10 is brought up to operating temperature. Further complicating the occurrence is the requirement that the outer and inner flow conduits 18 and 20 be made of the same material to avoid significant differential thermal expansion between them whereby the size of the flow channel 16 through the pump would be subject to change. Therefore, there is a decided need to provide an inner stator design that minimizes the gap at the stator iron-to-flow conduit interface at pump operating temperatures.

The inner stator coils 42 of this invention comprise several embodiments having their electrical terminals or leads projecting inwardly from the inner coil 42 since the inner conduit 20 prevents access to the outer circumference of the inner coil 42. Preferably, both ends of the coil 42 are used to provide the terminals for connection to a power source. Moreover, the coils 42 are preferably produced by winding the strips or ribbons 44 of copper or like metal in two or more tiers or layers either by multiple windings or combining two or more tiers, one superimposed upon the other.

One means in accordance with this invention, as shown in FIG. 4, comprises winding the opposite ends of a continuous or uninterrupted strip 44 of copper upon a pair of mandrels 54–54' rotating in opposite directions until all the free length of the strip 44 has been wound on the two mandrels 54, 54', whereupon two coil halves, i.e., first and second coil halves 42a and 42b, are adjoined by placing one on top of the other to form a two-tier coil 42. Thus the remaining intermediate copper strip section 56 connecting the two wound coil halves 42a, 42b provides a terminal portion which is located integral within the coil halves 42a, 42b or composite stacked column thereof.

More specifically, FIG. 4 illustrates schematically the forming of the inner stator coil 42 in accordance with one embodiment of the present invention having a plurality of the strips 44 being wound together for providing more flexibility in the strips 44 themselves. A multi-strand conductor strip is more flexible than a single strand strip of the same cross-section, and, therefore, the plural strips 44 improve the winding process. Each of the strips 44 is continuous and uninterrupted and has the first and second terminals designated 46a and 46b at opposite ends thereof, and the intermediate section 56 disposed therebetween. The respective first terminals 46a are suitably retained in slots on the first mandrel 54, and the second terminals 46b are similarly retained in slots of the second mandrel 54' at the beginning of the winding process. As shown in FIG. 4, three strips 44 are used in this exemplary embodiment and are simultaneously wound around the mandrels 54, 54' which rotate in opposite directions. The two mandrels 54, 54' ensure that the separately wound first and second coil halves 42a, 42b are each coplanar as the strips 44 are wound in spirals, with each of the three strips 44 radially abutting each other in turn to collectively form the windings of the first and second coil halves 42a, 42b.

As shown in FIG. 4, the several strips 44 are configured in the first and second coil halves 42a, 42b by being wound on the two mandrels 54, 54', with the first coil half 42a including a suitable plurality of coplanar windings or turns extending from the first terminals 46a to the intermediate section 56, with the first terminals 46a being disposed radially inwardly from the windings of the first coil half 42a, and the intermediate section 56 being disposed radially outwardly therefrom. Similarly, the second coil half 42b includes a plurality of coplanar windings extending from the second terminals 46b to the intermediate section 56, with the second terminals 46b being disposed radially inwardly from the windings of the second coil half 42b, and the intermediate section 56 again being disposed radially outwardly therefrom.

Figure 5:
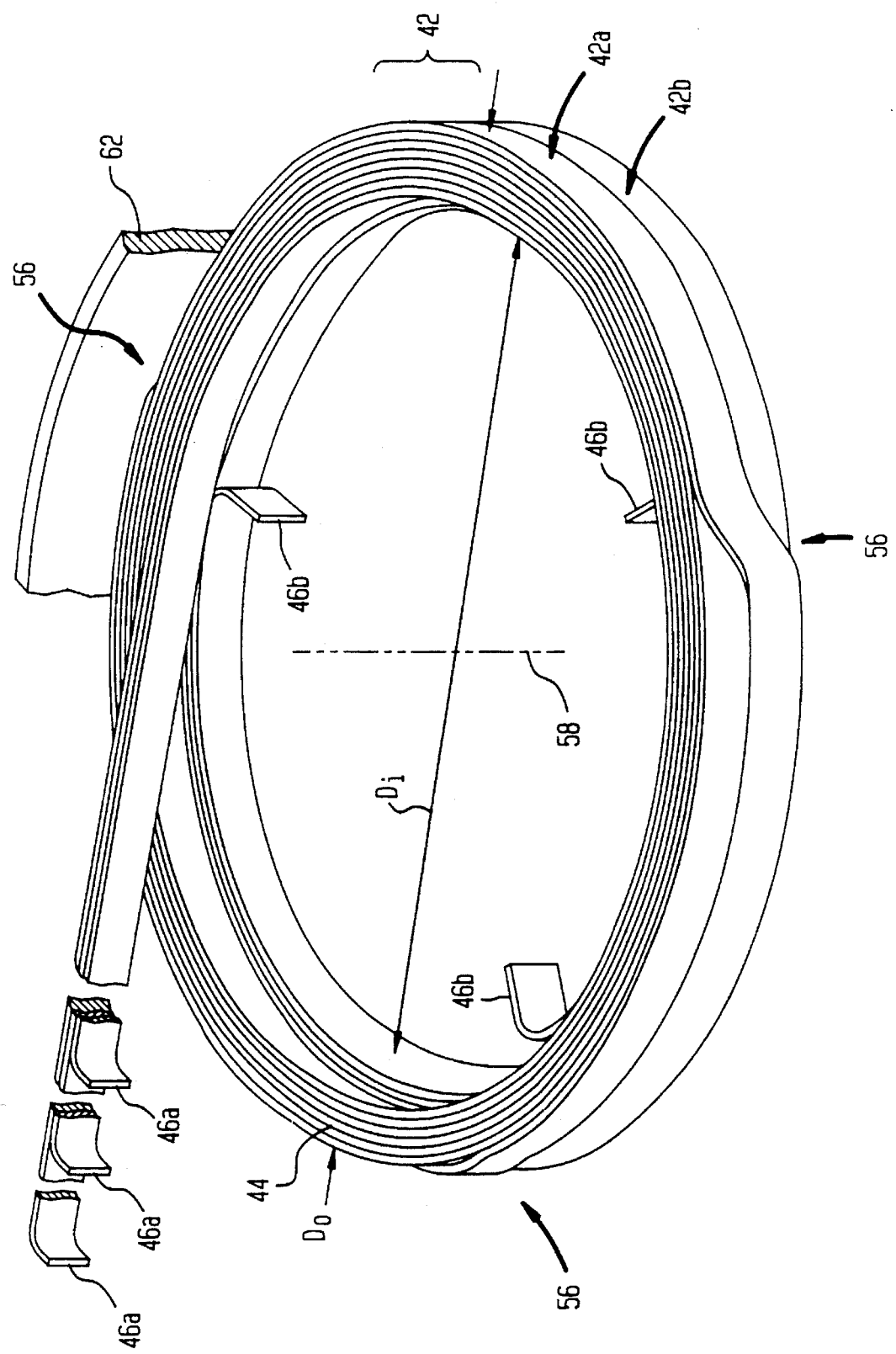
FIG. 5 is a perspective view of a two-tier wound coil of three copper strips stacked together after being wound in accordance with FIG. 4.

After the strips 44 are fully wound on the respective mandrels 54, 54' with little remaining slack at the intermediate section 56 therebetween, the first coil half 42a as shown in FIG. 5 may be suitably stacked upon the second coil half 42b and disposed coaxially therewith about a centerline axis 58 to form a two-tier coil 42. In this way, all of the first and second terminals 46a, 46b are disposed radially inwardly from the first and second coil halves 42a, 42b and preferably extend radially inwardly from the inner perimeters thereof, and the intermediate section 56 is disposed radially outwardly from the first and second coil halves 42a, 42b and extends radially outwardly from the outer circumference of the first and second coil halves 42a, 42b. As shown in FIG. 5, the intermediate section 56 of each of the three strips 44 is generally S-shaped for transitioning the several strips 44 from the outer circumference of the first coil half 42a to the outer circumference of the second coil half 42b. And, the intermediate sections 56 are preferably equidistantly spaced apart from each other around the circumference of the coil 42 to minimize bulging around the perimeter of the coil 42 which would otherwise occur if the sections 56 were at one location. In this way, and referring to FIG. 6, all of the first and second terminals 46a, 46b extend radially inwardly from the inner coil 42 and the intermediate sections 56 face radially outwardly, therefore leaving an unobstructed and substantially continuous outer circumference of the coil 42 which may be disposed closely adjacent to the inner circumference of the inner conduit 20 as illustrated in FIGS. 1 and 3. And, the spread-apart intermediate sections 56 maximize the volume occupied by the copper strips 44 within the envelope of the coil 42 while minimizing the space filled only with air to improve the performance of the coil 42.

Referring again to FIGS. 5 and 6, the first and second coil halves 42a, 42b preferably have equal or common outer diameters $D_o$, and equal or common inner diameters $D_i$ for forming a uniformly dimensioned two-tier inner coil 42. The inner coil 42 may then be conventionally wrapped with a suitable electrical insulation, such as tape 60 as shown in FIG. 6, to complete the fabrication of one of the inner coils 42, which may then be suitably stacked on its respective inner stator iron rings 48 (see FIG. 1).

Figure 7:
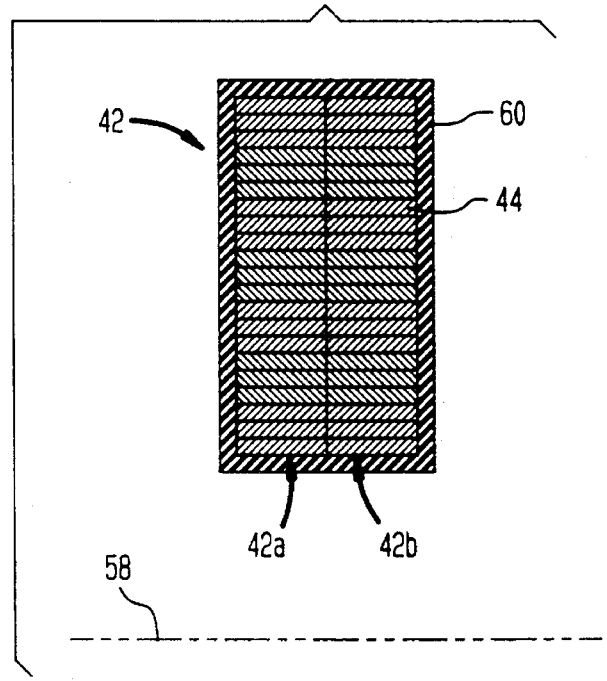
FIG. 7 is a transverse sectional view of the coil illustrated in FIG. 6 taken along line 7—7.

As shown in FIG. 7, each of the strips 44 preferably has a rectangular transverse section being longer in the axial direction than wide in the radial direction for forming a generally rectangular overall transverse section of the two-tier inner coil 42 which is longer in its radial direction than it is wide in the axial direction. In this way, the strips 44 abut each other in the radial direction relative to the centerline axis 58, as well as in the axial direction where the two coil halves 42a, 42b are stacked together, to maximize the amount of current-carrying area without wasted airspace therebetween. As shown in FIG. 7, the strips 44 are grouped in units of three as shown by the common crosse-hatching thereof since three individual strips 44 are used in the exemplary embodiment illustrated in FIGS. 4 and 7 to form the inner coil 42. Each coil half 42a, 42b, therefore, has alternating groups of three of the strips 44 extending in the radial direction to form seven windings or turns of each strip for example, with each coil half 42a, 42b, therefore, having twenty-one windings for a total of forty-two windings in the one inner coil 42.

Figure 6:
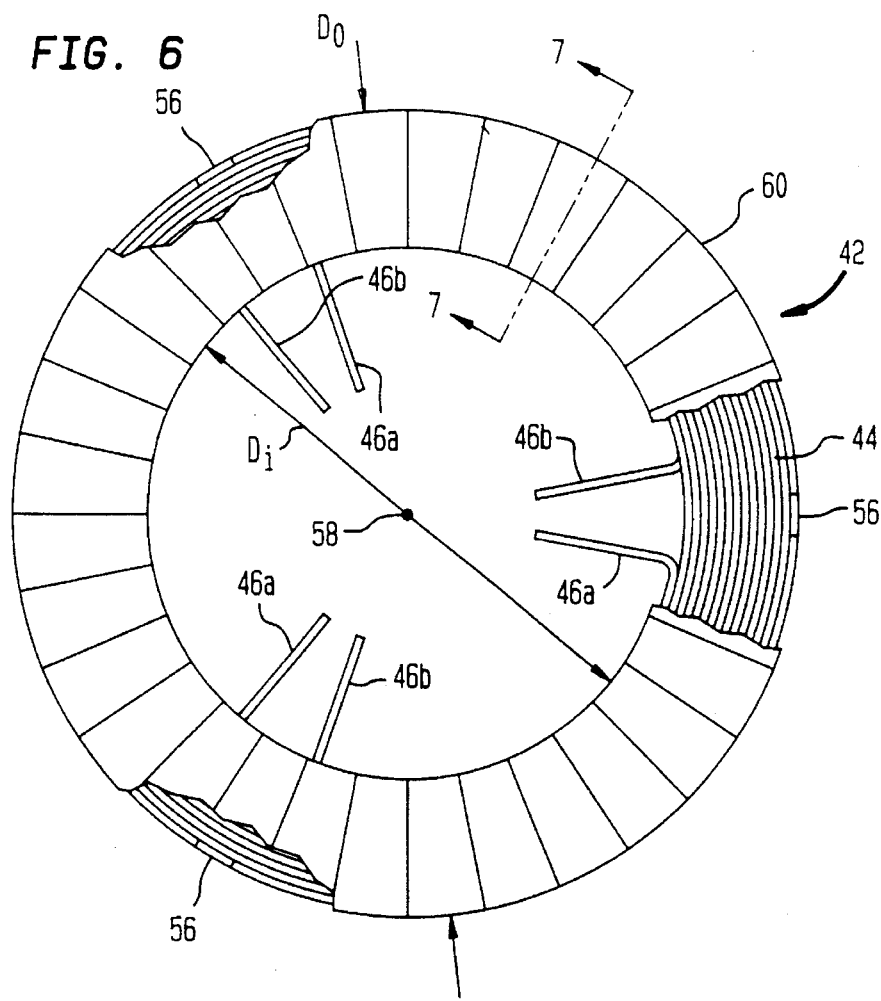
FIG. 6 is a top view, partly in section, of a completed three-strip coil as illustrated in FIG. 5 having radially inwardly extending terminals.

In the preferred embodiment illustrated in FIG. 6, the first and second terminals 46a, 46b of each of the plurality of strips 44 are grouped adjacent to each other in circumferentially spaced pairs and extend radially inwardly from the first and second halves of the inner coil 42. In this way, power conducting cables may be more readily routed and connected to the terminals 46a, 46b from inside the inner coil 42.

Figure 8:
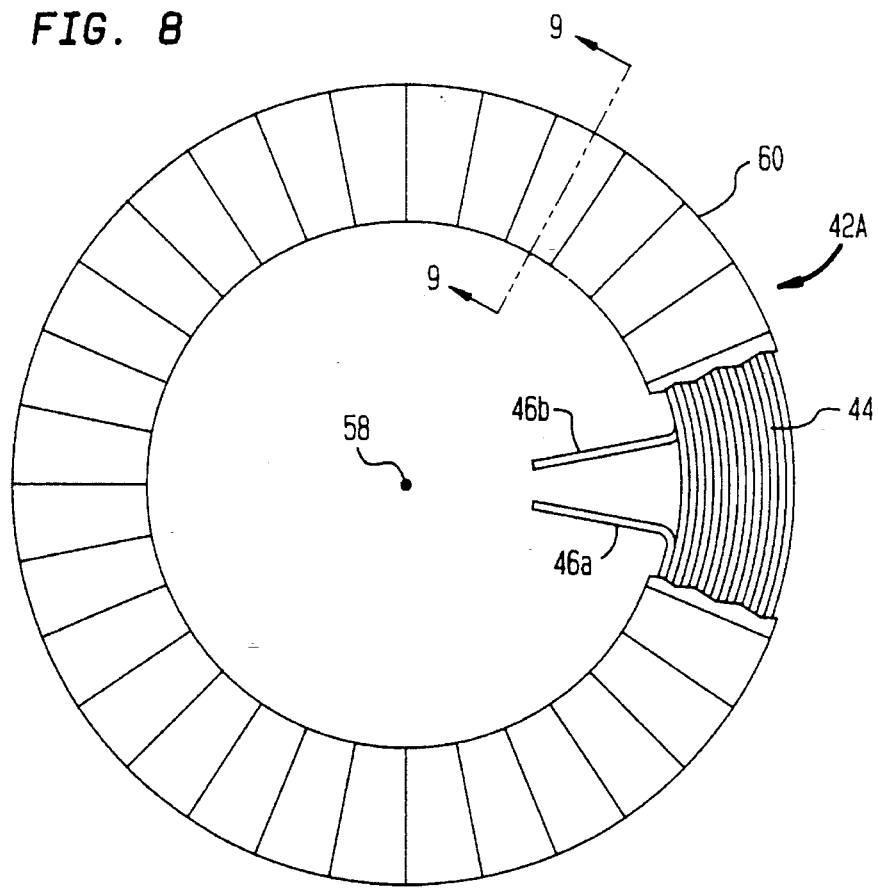
FIG. 8 is a top, partly sectional view, similar to FIG. 6 illustrating a coil having a single strip in accordance with another embodiment of the present invention.
Figure 9:
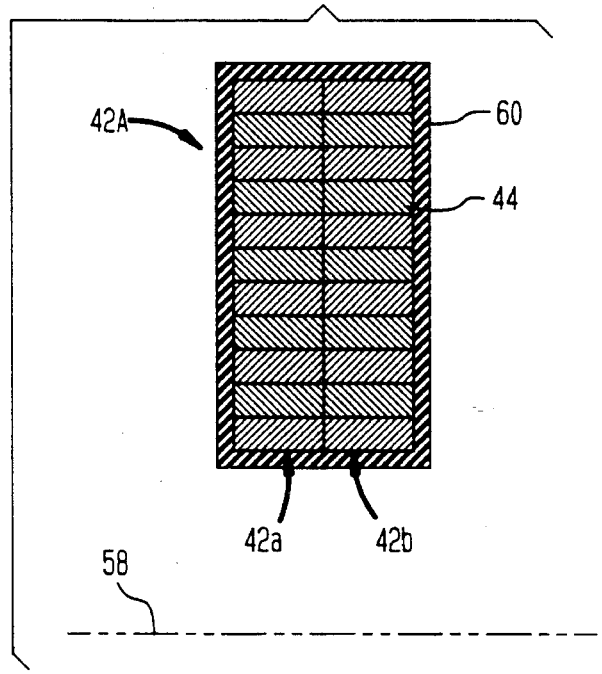
FIG. 9 is a transverse sectional view of the coil illustrated in FIG. 8 taken along line 9—9.

Any suitable number of individual strips 44 may be used to form the two coil halves 42a, 42b such as the three strips 44 comprising the inner coil 42 illustrated in FIGS. 4–7, as well as only a single strip 44 as shown in FIGS. 8 and 9 in accordance with another embodiment of the present invention. In this second embodiment, the inner coil, designated 42A, uses only a single strip 44 having single first and second terminals 46a, 46b at opposite ends thereof which is wound into the first and second coil halves 42a, 42b in the same manner as illustrated in FIG. 4. As shown in FIG. 9, each of the strips 44 again preferably has a rectangular transverse section similar to that shown in FIG. 7, with each rectangular section of the strip 44 having a cross-sectional area generally equal to the cross-sectional area of groups of three of the strips 44 illustrated in FIG. 7 for obtaining a generally equal overall configuration and collective cross-sectional area for the passage of current therethrough.

However, a single, thicker strip 44, is less flexible than multiple, thinner strips 44, which adds to the difficulty of the winding process. Of course, a single thinner strip 44 could be used to form the two-tier inner coil 42A illustrated in FIG. 9 but this would necessarily result in a longer length of the strip 44, and therefore longer current path. For example, for the same individual cross-sectional area, a single strip conductor would be about three times as long as a three-strip conductor for a similar total cross-sectional area of the full windings.

However, a single strip 44 is preferred, for example, to reduce the total number of the terminals 46a, 46b in the inner stator 40, with the ability to use a single strip 44 in each two-tier inner coil 42 being limited by the practical ability to bend and form the single strip 44 in the relatively tight spiral windings required to form the coil halves 42a, 42b as shown in FIG. 4. Of course, the larger the cross-sectional area of the strip 44 the less flexible it becomes, with single or multiple-strand strips 44 being selected as desired for each design application.

A single strip 44 is also preferred to eliminate the potential problem of bunching together of multiple strips 44 at the intermediate section 56, as shown in FIG. 4, which is due to slippage between the multiple strips 44 as they are wound from both ends. Such bunching requires either more careful rewinding of the strips 44, or manual backwinding from the intermediate section 56 to eliminate the bunching.

Variations of measures of this invention comprise winding both ends of the strip 44 on opposite rotating mandrels 54, 54' as described above with respect to FIG. 4, except that one coil such as the upper half coil 42a is wound with an undersized outer diameter. After the undersized upper half coil 42a is mated with the larger lower coil half 42b, a short cylindrical form 62, a portion of which is shown in FIG. 5, having an inside diameter equal to that of the finished coil 42, is placed around both coiled tiers. The conductor strips 44 of the upper tier are then encouraged to expand tightly outward against the form and one another by pushing and pulling, as required, on their free ends.

Another alternative means comprises winding the lower half coil 42b first on the mandrel 54' (see FIG. 4). The short cylindrical form 62 (see FIG. 5) is then placed around this lower tier 42b. Upon further rotation of the mandrel 54', the remaining partial or half-length sections of each copper strip 44 are simultaneously fed into the form 62, creating the upper coil half 42a as the remaining copper strip 44 is used up.

A variation of forming the two-tier coil 42 comprises integrally connecting the two coil halves 42a, 42b each having a separate length of copper strip 44. The two-tiered windings are then joined with a welded or brazed transition joint to form the intermediate section 56, rather than using the integral continuous strip 44 described above.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. An electrical coil comprising:

a continuous conductor strip having first and second terminals at opposite ends thereof and an intermediate section disposed therebetween, said strip being configured in first and second coil halves;

said first coil half including a plurality of windings extending from said first terminal to said intermediate section, said first terminal being disposed radially inwardly from said first coil half windings, and said intermediate section being disposed radially outwardly therefrom;

said second coil half including a plurality of windings extending from said second terminal to said intermediate section, said second terminal being disposed radially inwardly from said second coil half windings, and said intermediate section being disposed radially outwardly therefrom; and said first coil half being disposed coaxially with said second coil half with said first and second terminals being disposed radially inwardly from said first and second coil halves, and said intermediate section being disposed radially outwardly from said first and second coil halves.

2. A coil according to claim 1 wherein said windings of said first coil half are coplanar, and said windings of said second coil half are coplanar and parallel to said first coil half to form two tiers.

3. A coil according to claim 2 wherein said first and second coil halves have common outer and inner diameters, respectively.

4. A coil according to claim 3 wherein said strip has a rectangular transverse section.

5. A coil according to claim 4 having only a single strip.

6. A two-tier stator coil comprising a single continuous ribbon-like conductive strip having first and second terminal ends, wherein said first terminal end of said continuous ribbon-like conductive strip extends radially inward from an inner circumference of a first tier and said second terminal end of said first continuous ribbon-like conductive strip extends radially inward from an inner circumference of a second tier, said first and second tier being stacked in a coaxial arrangement.

* * * * *